April 12, 1938.  G. TAUSCHEK  2,113,634
TABULATING MACHINE
Filed April 30, 1935  3 Sheets-Sheet 1
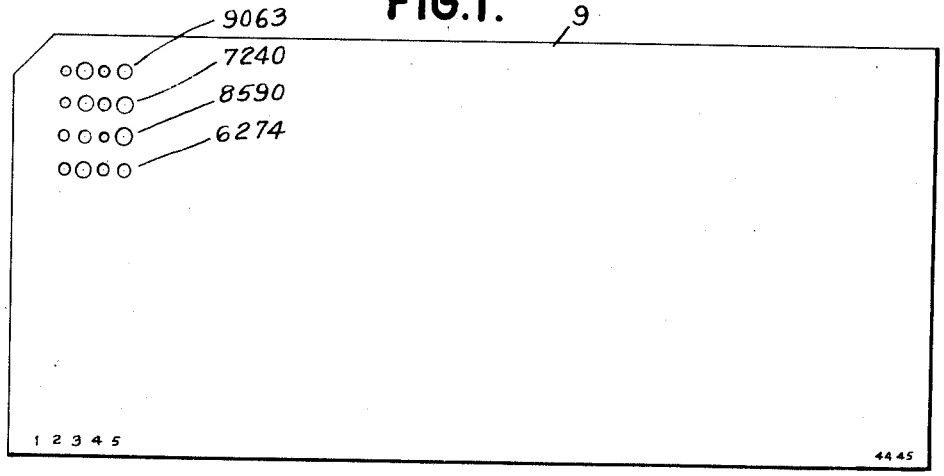
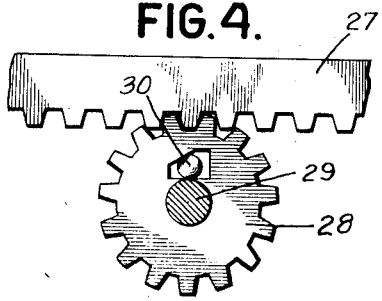
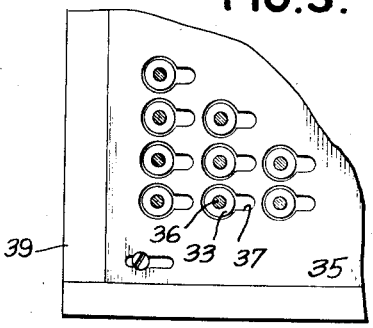
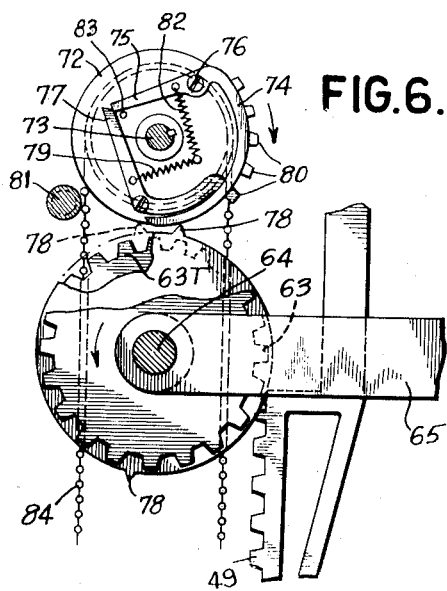
INVENTOR.
Gustav Tauschek
BY
W. M. Wilson
ATTORNEYS.

April 12, 1938.　　　G. TAUSCHEK　　　2,113,634
TABULATING MACHINE
Filed April 30, 1935　　　3 Sheets-Sheet 2
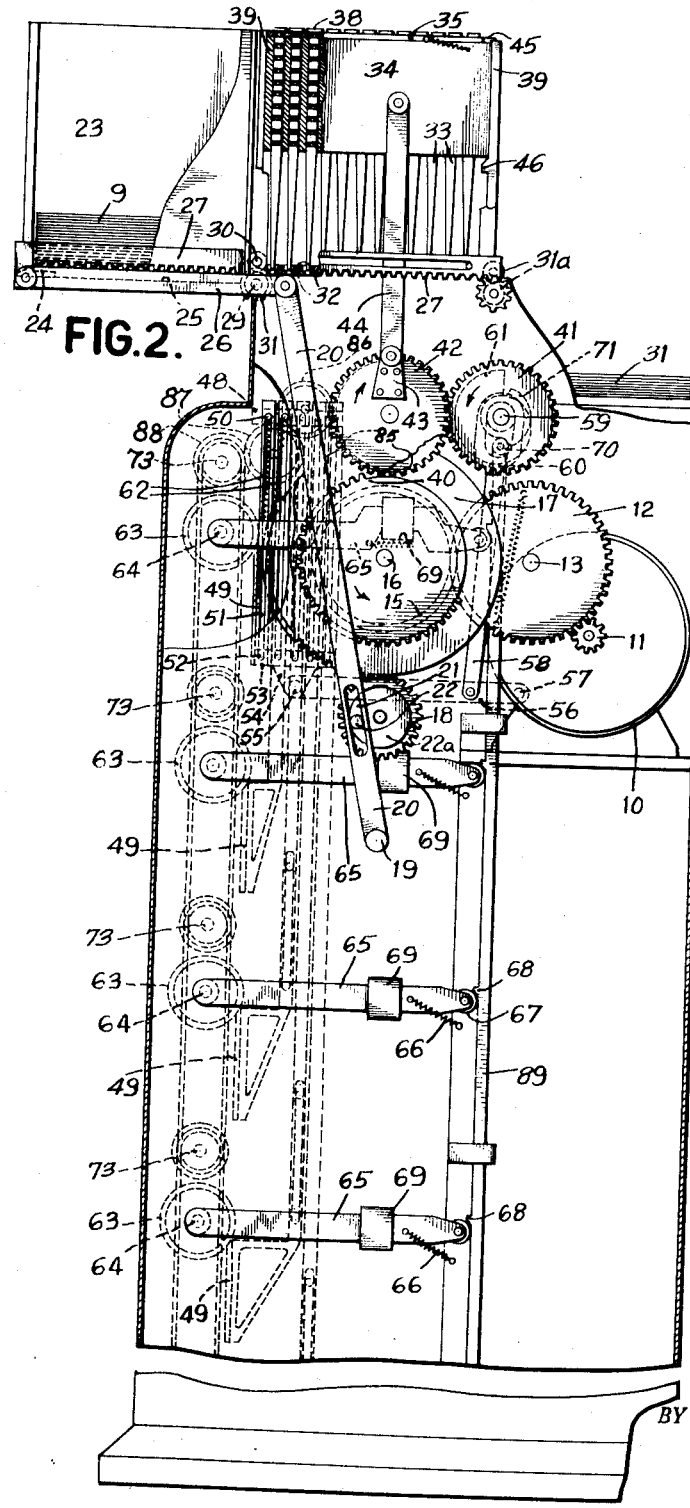
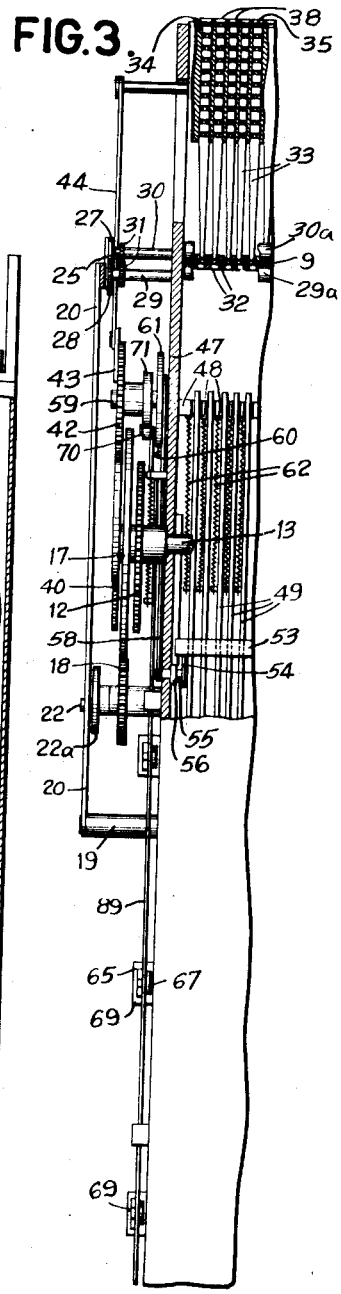
INVENTOR.
Gustav Tauschek
BY
ATTORNEYS.

April 12, 1938.  G. TAUSCHEK  2,113,634
TABULATING MACHINE
Filed April 30, 1935  3 Sheets-Sheet 3

Patented Apr. 12, 1938

2,113,634

UNITED STATES PATENT OFFICE

2,113,634

TABULATING MACHINE

Gustav Tauschek, New York, N. Y., assignor to International Business Machines Corporation, New York, N. Y., a corporation of New York Application April 30, 1935, Serial No. 19,032

7 Claims. (Cl. 235—61.11)

This application is a continuation in part of my application filed October 31, 1929, Serial No. 403,854.

The present invention relates, particularly, to improvements in the means for analyzing members and the construction of analyzing members provided with controlling perforations, such members being cards, or the like, employed for controlling the operation of devices in card-controlled machines used for statistical and calculating purposes. In the description of several known arrangements the use of cards is assumed. The improved arrangement for analyzing cards may, with equal benefits, be employed for analyzing control members of other forms, such as, metal plates, strips or the like.

One well known type of analyzing device analyzes cards moving in synchronism with the devices to be controlled such as accumulating, recording, etc., and the control devices therefor are rendered effective by the perforations to cause the movement of the devices to be controlled at positions corresponding to the perforations at the index points analyzed.

Another form of mechanism for analyzing cards consists in providing a series of control members, such as pins, one for each index point position, the position of each pin being changed when encountering a perforation whereby the positioned pin is capable of controlling a device to a commensurate and proportional extent.

Finally, another arrangement consists in analyzing perforated cards in which each row has a number of perforations corresponding to the number or value to be represented. Each control perforation causes a controlling electrical impulse to be transmitted, the summation of such electrical impulses effecting a movement of the counting or recording mechanism commensurate with the value designated.

In contra-distinction to the three arrangements described, namely, in which the representation of the value is determined solely by the position of a control perforation or by the number of control perforations, the present invention is based upon a novel construction of cards in which control perforations or indications at a single index point position may be of sizes differing from each other and that such differences in sizes, made preferably in accordance with the numerical values to be expressed, may be employed to control statistical operations.

The controlling devices in the machine are, therefore, not set in action differentially in accordance with the positions of the perforations on the card but, such perforations, independently of their positions, effect their control simply by their particular sizes. The size of the perforation made at a common index point position determines the differential adjustment of the controlling devices.

The perforations, according to the present invention, are of different sizes so that in the mechanical embodiment of the invention they cause a movement of a conical analyzing pin a proportional amount to cause a control action to take place which is proportional to the size of the perforation at the particular index point analyzed. The extent of such movement corresponds entirely to the size of the perforation on the card at the index point analyzed and the pin measuring the size of the perforation controls a corresponding displacement of an indicating mechanism, or if desired, accumulating, recording mechanisms and the like.

Various other objects and advantages of my invention will be obvious from the following particular description of one form of mechanism embodying the invention or from an inspection of the accompanying drawings; and the invention also constitutes certain new and novel features of the construction and combination of parts hereinafter set forth and claimed.

In the drawings:—

Fig. 1 is a plan view of a tabulating card partly perforated according to the present invention.

Fig. 2 is a cross sectional view of the improved tabulating machine, the full length of the machine not being shown since, in view of the duplication of certain units it appears unnecessary to show the arrangement complete.

Fig. 3 is a back view of a part of the machine, part of the interior being shown by breaking away some of the cabinet enclosure.

Fig. 4 is a detail of a one-way clutch preferably employed to drive the card feeding rollers unidirectionally.

Fig. 5 is a plan view showing a part of the top of the analyzing unit and particularly the locking plate for the analyzing members.

Fig. 6 is a view in side elevation showing the preferred form of transfer mechanism.

Figure 7:
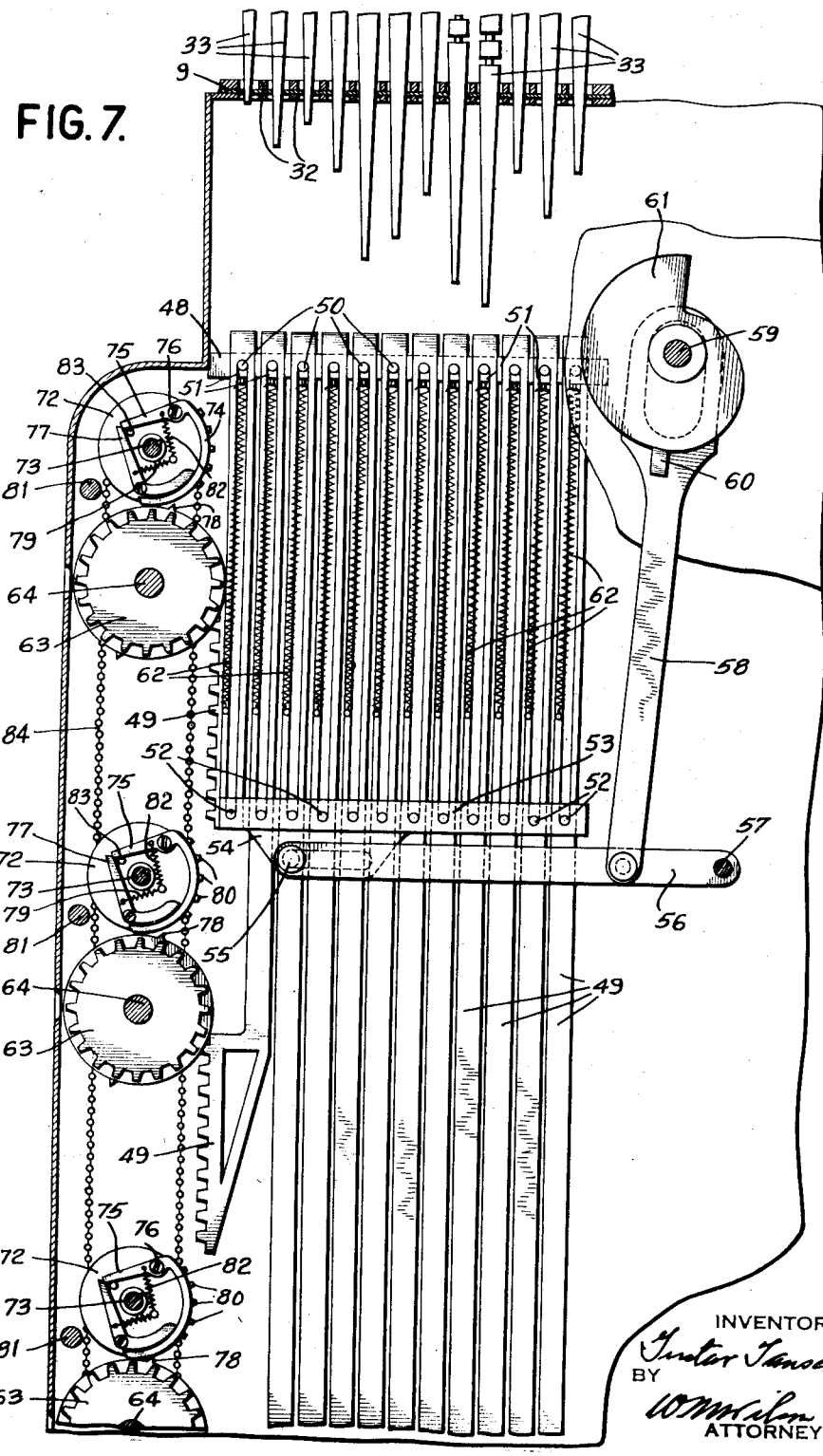
Fig. 7 is a cross-sectional view of the improved tabulating machine and is similar to Fig. 2, but omits the illustration of the operating gears to show other parts more clearly.

In Fig. 1 there is shown a tabulating card 9 constructed according to the present invention and the same may be perforated by hand or a suitable machine. The card is provided with forty-five columns each of which contains twelve index points. The card may be perforated at these index points to represent five hundred and forty digits.

The "0" digit is represented by the largest hole and the "9" digit is represented by the smallest hole. The card is shown partly perforated to represent by perforations therein in the four horizontal rows the following numbers: 9063, 7240, 8590, and 6274 which amounts are each entered in separate totalizers. The machine is provided with totalizers which can be split by omitting the transfer mechanism between certain wheels to provide for any number of totalizers. Each multi-denominational number of a series of numbers to be added is represented by a number of perforations arranged in a horizontal row. For example, the number 9063 is represented by perforations in the first horizontal row of the columns 2—5 and is added in the totalizer comprising totalizer wheels related to columns 1—6. The next number to be added in this totalizer would also appear perforated in the same horizontal row of columns 1—6 of the successive card. Hence the machine can be provided with an exceedingly large number of totalizers and can totalize a large number of values. The card is shown by way of example perforated to represent a multi-denominational number in a horizontal row but obviously the card may be perforated to represent a multi-denominational number in a vertical column as well and the invention is not restricted to any particular arrangement of perforations.

Contrasting to prior practice each index point is perforated to represent any digit and only one index point is necessary to represent any digit, as compared to prior arrangements where a complete card column is necessary to represent a single digit.

The driving means for the machine comprises a motor 10 which is within the cabinet enclosure of the tabulating machine. The shaft of the motor 10 is provided with a pinion 11 adapted to drive a gear 12 secured to a transverse shaft 13. Gear 12 is continuously in mesh with a gear 15 secured to a stub shaft 16. Attached to the gear 15 is a mutilated gear 17 having teeth for one third of its periphery but having its initial driving teeth in engagement with a pinion 18. One-third of a revolution of the gear 17 will drive the pinion 18 a complete revolution.

Pivoted by a stud 19 is an arm 20 provided with a slot 21 engaging a pin 22 carried by a disk 22a rotatable with the pinion 18. It is obvious that a complete revolution of pinion 18 will effect a reciprocation of the arm 20.

The cards 9 to be analyzed are placed in a hopper 23 and drop downwardly by gravity so that they are fed singly by the usual picker 24 carried by a longitudinally slidable plate or frame 25. The latter has a link connection 26 to the arm 20.

The frame 25 carries a rack 27 the central part being normally in engagement with a pinion 28 (Fig. 4) loose on a shaft 29. Within an aperture of the gear 28 is a ball or cylinder 30 (Fig. 4). When rack 27 is shifted to the right the gear 28 is rotated clockwise thereby wedging element 30 between the inclined edge of the aperture in gear 28 and the periphery of the shaft 29. Shaft 29 is thus driven so as to drive a feeding roller 29a (Fig. 3) secured thereto. A cooperating feeding roller 30a is carried by a shaft 30 and shafts 29 and 30 are intergeared by pinions 31. The right end of the rack 27 is also adapted to drive a device similar to that shown in Fig. 4 to drive a set of rollers 31a. The picker 24 moves the bottom card from the hopper 23 to the first set of rollers 29a, 30a. The leading edge of the card fed is engaged by the right set of feeding rollers 31a and the latter is adapted to feed those cards which have already controlled the operation of the machine to a discharge hopper 31.

After a half revolution of gear 18 the arm 20 is returned but due to the counterclockwise rotation of gear 28 caused by the return of the rack 27 gear 28 will rotate independently of the rotation of the shaft 29 and the two sets of feeding rollers will remain stationary to hold the card in its proper analyzing position.

When the card 9 is in its proper analyzing position it will be between two die plates 32, shown in Fig. 3. The die plates are provided with five-hundred and forty holes each of which is large enough to receive the related conical analyzing pin 33 at its greatest diameter.

The analyzer comprises a block 34 which is perforated to receive the five-hundred and forty conical analyzing pins 33. The conical pins are in exact alignment with the index point positions of the card. Upon the top of the block 34 there is slidably mounted a locking plate 35 which, as shown in Fig. 5, has a series of apertures each large enough to receive the related conical pin 33. Each pin 33 has ten annular cuts each to form a reduced portion 36 of the pin 33 and the locking plate 35 is provided with locking slots 37 adapted to receive the reduced portions of the pins 33. Each conical pin is adapted to take a position in accordance with the size of the perforation analyzed and when the plate 35 is shifted to the left the locking slots 37 will engage the reduced portions 36 of the pins in their various positions, thereby holding them securely locked. Each pin 33 is held from dropping downwardly and in normal position by a circular head portion 38 which is larger than the hole in the plate 35 in which the pin 33 fits.

The block 34 is slidably mounted and held by two vertical side plates 39. The means for lowering the block 34 with the conical pins 33 will now be explained.

To the gear 17 there is secured a mutilated gear 40 having teeth for two-thirds of its periphery which gear teeth are adapted to drive a gear 41 a complete revolution through an idler gear 42. The teeth of the gear 40 are so positioned as to rotate the gear 42 after the gear 17 no longer causes the rotation of gear 18. This sequence in driving operation causes the analyzing of a card to take place after the positioning of the card in the analyzing means.

To the idler gear 42 there is secured a bracket 43 which forms the pivot connection to gear 42 of a link 44 which is pivoted to the block 34. This operating mechanism may be duplicated for both sides of the machine.

When the gear 42 rotates a half-revolution the block 34 will be in its lowermost position and the pins 33 passing through the card holes will be stopped at different positions. At this time a lug 45 of the slide 35 will engage the inclined edge of a lug 46 of the right guide plate 39 causing the slide 35 to be shifted to the left to lock the pins 33 in the manner previously described so that the latter can determine the differential movements of totalizer actuating devices now to be described.

To suitable frame members there are secured bars 48 each of which is slotted to receive the upper ends of a series of racks 49, each rack being guided at its upper end by a pin 50 carried by bar 48. The pin 50 engages a longitudinal slot 51 formed in the rack 49. The lower ends of the racks 49 are guided by having their slots 51 receiving pins 52 carried by a bar or reciprocable frame piece 53.

The bar 53 has a depending portion 54 to which is pivoted at 55 one end of an arm 56. The arm 56 is pivoted at 57. Connected to the arm 57 is a pitman 58 slotted at its upper end to receive a sleeve carried by the pivot shaft 59 of the gear 41. The pitman 58 carries a lug 60 engaging a cam 61 rotatable with the gear 41. To each rack 49 there is secured a spring 62, the upper ends of the springs being connected to the stationary bar 48. Hence the springs 62 normally tend to raise all the racks 49 and they urge the lug 60 against the cam 61.

After gear 41 is given a half-revolution, at which time the analyzing operation has been performed, the lug 60 drops off the high part of cam 61 and the springs 62 elevate the racks 49 until they strike the lower ends of the variously positioned conical pins 33, which are now locked.

In this manner the racks are elevated differential amounts. If the index point has the largest perforation representing zero, the conical pin 33 will drop its greatest extent of movement, thus preventing any movement of the related rack 49. If the perforation represents "9" then the conical pin 33 will receive a slight movement, sufficient to protrude through the card hole and lower die plate 32 and thus permit the related rack 49 to move nine steps of movement.

For each vertical column of the card there are twelve analyzing pins 33 and twelve racks 49 and their lower ends are of different lengths so as not to interfere with each other's movement and thus permit the rotation of the totalizer wheels 63. A series of wheels 63 related to a horizontal line of card holes is mounted upon one of a series of shafts 64 and conversely for a vertical column of twelve holes the related totalizer wheels are mounted on a series of twelve shafts 64.

Each totalizer shaft 64 which carries the series of wheels 63 is carried by a pair of side frames 65 which are slidably mounted in guide blocks 69. Springs 66 urge the totalizer shafts 64 to the right to normally mesh the totalizer wheels 63 with the teeth of the racks 49 as shown in Fig. 6 and hold rollers 67 carried by one of the side frames 65 against projections 68 of a slide 89.

Slide 89 carries a roller 70 engaging a profile cam 71 rotatable with the gear 41 and said arrangement may be duplicated for each side of the machine. The cam 71 is arranged to depress the slide 89 after the racks 49 have been elevated and differentially displaced. Slide 89 by its projections 68 moves the series of totalizer shafts 64 to the left freeing the totalizer pinions 63 from the racks 49. At this time the cam 61 is now effective to depress the frame 53 and the pins 52, now engaging the lower ends of the slots 51 in the racks 49, will return the latter downwardly to normal without, however, affecting the position of the rotated totalizer pinions 63. The machine is now in normal position ready to effect the analyzing of a subsequent card 9 to cause the accumulation of the amounts represented thereon.

Any suitable transfer mechanism may be provided for the totalizers and such may constitute the devices shown in Fig. 6.

An element 72 is splined to a drive shaft 73 which is given a complete revolution after each item entering operation. A latch member having a circular portion 74 and a straight extension 75 is pivoted at 76 to the element 72.

The member 74—75 is normally in the position shown in Fig. 6 so that the lower end of the circular part 74 can be struck by a tens transfer projection 78 of a circular element rotatable with the units totalizer wheel 63, for example in explaining the transfer mechanism for one order. When the units totalizer wheel passes through zero, projection 78 engages the lower end of the circular part 74 thereby shifting the extension 75 so as to be disengaged from an arm 77. The latter thereupon is rocked by the action of its spring 79 to thus cause circular element 74 clear of the transfer projection 78 and bring a tooth 80 integral with the arm 77 into such a position that when shaft 73 is subsequently turned it will engage between a pair of teeth of the tens totalizer pinion 63T. As shaft 73 turns in this manner the single tooth 80 will drive the tens totalizer pinion one step thereby effecting the transfer.

As the element 72 rotates further the tooth 80 will strike a rod 81 causing the arm 77 to rotate counterclockwise so that when the arm 77 is thus rocked the latch member 74—75 is free to be rocked by its spring 82 to abut a pin 83 and is, therefore, now in normal position. When the arm 77 is completely free of the rod 81 it will be urged by its spring 79 to again engage and be latched by the extension 75. This is the normal position of the parts ready for another transfer operation.

To effect transfers by transfers, which operation is well known in the art, the transfer teeth 80 are staggered as shown in Fig. 6 so as to act successively upon the different totalizer pinions. In this manner if a higher order wheel is at nine and a transfer of a unit thereto is effected by a lower order wheel the transfer tooth 80 of the higher order wheel will be adjusted to effect a transfer to the wheel of the third order, and so on if that wheel is also at nine.

All of the transfer shafts 73 are driven simultaneously by a chain drive 84 (Fig. 6) and one of said shafts is adapted to have a suitable gear connection to one of the driving gears so as to make a complete revolution after the item entering operation. In the present arrangement this is effected by a mutilated gear 85 attached to one of the idler gears 42 (Fig. 2) the teeth of which gear 85 are effective to drive the uppermost transfer shaft 73 through a series of intermeshing gears 86, 87 and 88, the latter being secured to the uppermost shaft 73.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:—

1. In a tabulating machine, in combination, an individual plane record member provided with a plurality of index point positions perforated with holes of sizes varying progressively to represent different values, each hole designating a particular numerical value solely by the size of the hole and without reference to the location of the hole, a plurality of analyzing means each of which is correlated with a particular index point position for determining the size of the hole at such position, means for causing each analyzing means to determine the size of the perforation at the correlated index point position, and value representing control means controlled by said analyzing means in accordance with the sizes of the perforations analyzed by said analyzing means.

2. In a tabulating machine, in combination, an individual plane record member provided with a plurality of index point positions perforated with holes of sizes varying progressively to represent different values, each hole designating a particular numerical value solely by the size of the hole and without reference to the location of the hole, a plurality of analyzing members each projectible through a hole located at a correlated index point position for determining the size thereof, means for causing each member to project through the hole located at a correlated index point position to cause said member to be displaced a distance dependent upon the size of the hole made at the correlated index point position, and value representing control means controlled by said analyzing members in accordance with the displacements of the latter.

3. In a tabulating machine, in combination, an individual plane record member provided with a plurality of index point positions perforated with circular holes of sizes varying progressively to represent different numerical values, each hole designating a particular numerical value solely by the diameter of the hole and without reference to the location of the hole, a plurality of conically-shaped analyzing members correlated with said index point positions and each movable through the hole located at the correlated index point position for determining the diameter thereof, means for causing each analyzing member to move through the hole located at the correlated index point position of said record member until the movement of the analyzing member is stopped by the hole, and control means controlled by the analyzing members in their stopped position.

4. In a tabulating machine, in combination, a tabulating card designating a multi-denominationally ordered number of different digits by a corresponding number of adjacently located perforations provided in said card and of sizes varying progressively, each perforation designating a numerical value without reference to its location and solely by its size, value representing control means, a plurality of analyzing means for determining the sizes of the perforations and each operatively correlated with the perforation at the same position of each tabulating card, and means for causing under control of said analyzing means the operation of said value representing control means in accordance with the sizes of the perforations determined by said analyzing means.

5. In a tabulating machine, in combination, a single machine controlling member provided with perforations to represent by perforations a denominationally ordered number, the perforations being of different sizes varying progressively to represent different digits of a number and the digital value being designated solely by the size of the perforation, as distinguished from designating a value by reference to the location of a perforation, a set of analyzing means for determining the sizes of the perforations, an entry means comprising a plurality of denominationally ordered actuating means, and means for causing said actuating means to be controlled by said set of analyzing means in accordance with the sizes of the perforations analyzed by said analyzing means.

6. In a tabulating machine, a tabulating card provided with a series of perforations of different sizes varying progressively to represent by the sizes alone the digital values of a multi-denominationally ordered number, separate perforation analyzing means movable through said perforations for determining the sizes thereof, means for causing said analyzing means to move through said perforations to extents dependent upon the sizes of the perforations and thereafter to move out of coaction with said perforations, means for locking said analyzing means when the latter are moved to different extents, item entering actuators, means for causing said actuators to be moved under control of said analyzing means to differential distances dependent upon the extents of movement of said analyzing means while the latter are locked, and means for then restoring said actuators.

7. In a tabulating machine controlled by successive cards, a tabulating card perforated with a series of perforations of different sizes to designate by the sizes alone the digital values of a multi-denominationally ordered number, an operating mechanism for said tabulating machine, separate analyzing means for determining the sizes of said perforations, means operated by said operating mechanism for causing said analyzing means to determine the sizes of said perforations, and value representing control means controlled by said analyzing means in accordance with the sizes of the perforations analyzed by said analyzing means.

GUSTAV TAUSCHEK.